(12) United States Patent
Kim et al.

(10) Patent No.: US 12,498,574 B2
(45) Date of Patent: Dec. 16, 2025

(54) MULTI-DISPLAY ASSEMBLY FOR ARTIFICIAL REALITY SYSTEMS

(71) Applicant: META PLATFORMS, INC., Menlo Park, CA (US)

(72) Inventors: Cheonhong Kim, Mountain View, CA (US); Min Hyuk Choi, San Jose, CA (US); Donghee Nam, San Jose, CA (US); Zhiming Zhuang, Sammamish, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 18/315,305

(22) Filed: May 10, 2023

(65) Prior Publication Data

US 2024/0377636 A1    Nov. 14, 2024

(51) Int. Cl.
*G02B 27/01*    (2006.01)
*G09G 3/3208*    (2016.01)

(52) U.S. Cl.
CPC ....... *G02B 27/0172* (2013.01); *G09G 3/3208* (2013.01); *G02B 2027/0178* (2013.01); *G09G 2340/0407* (2013.01)

(58) Field of Classification Search
CPC .......... G06F 1/1652; G09G 2300/023
See application file for complete search history.

(56) References Cited

U.S. PATENT DOCUMENTS

| | | | |
|---|---|---|---|
| 10,229,960 B2 | 3/2019 | Hack et al. | |
| 10,373,294 B1 * | 8/2019 | Wilson | G06F 3/0346 |
| 10,692,186 B1 * | 6/2020 | Mercier | G06F 3/013 |
| 10,768,883 B2 * | 9/2020 | Jeong | G06F 3/1446 |
| 10,809,533 B2 | 10/2020 | Cheng et al. | |
| 11,048,091 B1 | 6/2021 | Lansel et al. | |
| 2004/0223093 A1 * | 11/2004 | Nakayoshi | G02F 1/1333 349/58 |
| 2004/0227703 A1 | 11/2004 | Lamvik et al. | |

(Continued)

OTHER PUBLICATIONS

Li J., et al., "Micro Organic Light Emitting Diode Arrays by Patterned Growth on Structured Polypyrrole," Advanced Optical Materials, Mar. 2020, vol. 8, No. 10, 1902105, 5 pages.

(Continued)

*Primary Examiner* — Sepehr Azari
(74) *Attorney, Agent, or Firm* — Greenberg Traurig, LLP

(57) ABSTRACT

A head-mounted display including multiple displays tiled together is provided. A first display may include an active region and an inactive region. A second display may be aligned with the inactive region. The first display and the second display may have different resolutions and may present visual information with different display qualities based on their respective resolutions. For example, the first display may include a lower resolution than the second display. The inactive region may be centered in the first display, and the second display may be centered with respect to the first display. The head-mounted display may provide a continuous image(s) (or video(s)) with a high resolution on the second display, while providing the remainder of the image(s) on the low resolution first display. Based on the multiple displays being tiled, the multiple displays may present one or more images, or one or more videos, in a non-overlapping manner.

20 Claims, 12 Drawing Sheets

(56) References Cited

U.S. PATENT DOCUMENTS

| | | | | |
|---|---|---|---|---|
| 2010/0201604 | A1* | 8/2010 | Kee | G06F 1/1641 |
| | | | | 345/1.3 |
| 2014/0126228 | A1* | 5/2014 | Lee | F21V 21/00 |
| | | | | 362/382 |
| 2014/0266990 | A1* | 9/2014 | Makino | G02B 27/0172 |
| | | | | 345/8 |
| 2015/0355514 | A1* | 12/2015 | Lin | G09G 3/3648 |
| | | | | 349/44 |
| 2016/0188276 | A1* | 6/2016 | Li | G06F 3/0487 |
| | | | | 345/156 |
| 2017/0031643 | A1* | 2/2017 | Jeong | G06F 1/1647 |
| 2017/0212717 | A1* | 7/2017 | Zhang | G02B 27/017 |
| 2017/0289324 | A1* | 10/2017 | Yeo | G03B 29/00 |
| 2017/0323596 | A1* | 11/2017 | Moulton | G09G 3/2092 |
| 2018/0144722 | A1* | 5/2018 | Zhou | G09G 5/14 |
| 2019/0043167 | A1* | 2/2019 | Steyskal | G02B 27/0172 |
| 2019/0198575 | A1* | 6/2019 | Liu | G02B 5/003 |
| 2019/0386230 | A1* | 12/2019 | Tang | H10K 59/873 |
| 2020/0166752 | A1* | 5/2020 | Konttori | G02B 27/0172 |
| 2021/0378109 | A1* | 12/2021 | Kim | B32B 3/18 |
| 2022/0216289 | A1* | 7/2022 | Lee | B32B 9/00 |
| 2022/0278185 | A1 | 9/2022 | Hack et al. | |
| 2023/0080928 | A1* | 3/2023 | Cui | G09F 9/30 |
| | | | | 345/173 |
| 2023/0176442 | A1* | 6/2023 | Kim | H10K 59/121 |
| | | | | 348/77 |
| 2023/0407022 | A1* | 12/2023 | Kim | B32B 27/08 |

OTHER PUBLICATIONS

Parbrook P.J., et al., "Micro-Light Emitting Diode: From Chips to Applications," Laser Photonics Reviews, Mar. 2021, vol. 15, No. 5, 2000133, 18 pages.

European Search Report for European Patent Application No. 24166527.2, dated Sep. 24, 2024, 7 pages.

* cited by examiner

MULTI-DISPLAY ASSEMBLY FOR ARTIFICIAL REALITY SYSTEMS

TECHNICAL FIELD

This application is directed to displays, and more particularly, to a multi-display system in which displays with different resolutions may be tiled together.

BACKGROUND

Devices, such as head-mounted displays, include a display used in applications such as virtual reality. Typically, the display includes a single display. The display technology selected for the display may be chosen from different technologies. For example, the display may include an organic light-emitting diode (OLED) display. In most instances, an OLED display is lower in cost as compared to other display types, including a micro OLED display. Accordingly, for about the same cost, a display with OLED technology may include a larger area as compared to a display with micro OLED technology. However, attributes such as pixel density (e.g., pixels per degree (PPD)) in OLED displays may be lower than that of micro OLED displays. In some VR applications, the pixel density in OLED display may be insufficient, leading to noisy or blurry images and rendering an undesirable user experience.

BRIEF SUMMARY

Some examples of the present disclosure are directed to a head-mounted display that includes multiple displays that may be tiled together to provide an artificial reality experience to users. One of the displays may include a relatively low resolution display, while another display may include a high resolution display.

In one example aspect, a head-mounted display is provided. The head-mounted display may include one or more processors. The head-mounted display may further include a first display. The first display may include a first active region configured to present first visual information. The first display may further include an inactive region surrounded by the first active region. The head-mounted display may further include a second display that may include a second active region aligned with the inactive region. The second active region may be configured to present second visual information. The one or more processors may be configured to provide one or more commands to present at least one image or at least one video, based on the first visual information and the second visual information, at the first display and the second display such that the at least one image or the at least one video is non-overlapping on the first active region and the second active region.

In another example aspect, an assembly is provided. The assembly may include a first display that may include an opening. The first display may include a first resolution. The assembly may further include a second display coupled to the first display at the opening. The second display may include a second resolution different from the first resolution.

In yet another example aspect, a display is provided. The display may include a front plane. The front plane may include an active region comprising pixels. The front plane may further include an inactive region surrounded by the active region. The inactive region may be free of the pixels.

The display may further include a backplane configured to control illumination of the pixels and present visual information on the front plane.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

Certain features of the subject technology are set forth in the appended claims. However, for purpose of explanation, several examples of the subject technology are set forth in the following figures.

DETAILED DESCRIPTION

Figure 1:
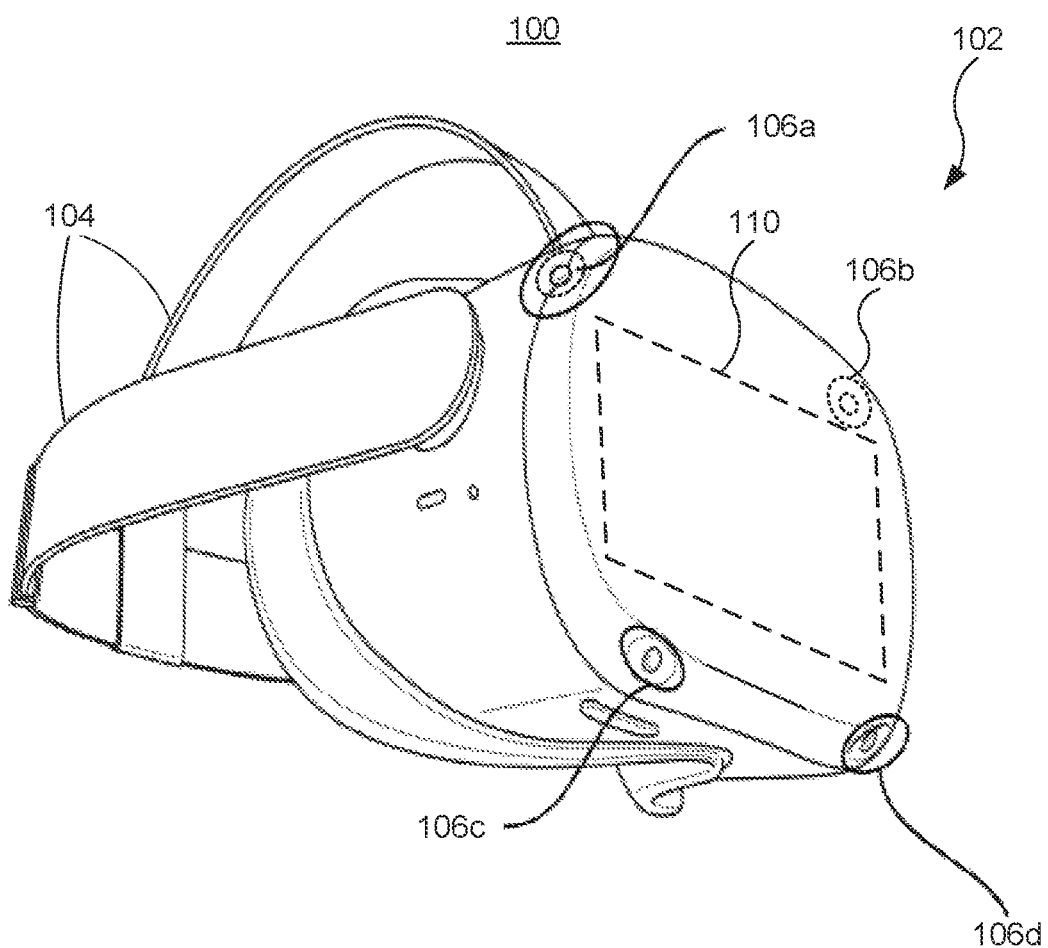
FIGS. 1 and 2 illustrate examples of an artificial reality system, in accordance with aspects of the present disclosure.

Some embodiments of the present disclosure will now be described more fully hereinafter with reference to the accompanying drawings, in which some, but not all embodiments of the disclosure are shown. Indeed, various embodiments of the disclosure may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the disclosure. Moreover, the term "exemplary," as used herein, is not provided to convey any qualitative assessment, but instead merely to convey an illustration of an example. Thus, use of any such terms should not be taken to limit the spirit and scope of embodiments of the present application. It is to be understood that the methods and systems described herein are not limited to specific methods, specific components, or to particular implementations.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, a Metaverse may denote an immersive virtual space or world in which devices may be utilized in a network in which there may, but need not, be one or more social connections among users in the network or with an environment in the virtual space or world. A Metaverse or Metaverse network may be associated with three-dimensional (3D) virtual worlds, online games (e.g., video games), one or more content items such as, for example, images, videos, non-fungible tokens (NFTs) and in which the content items may, for example, be purchased with digital currencies (e.g., cryptocurrencies) and other suitable currencies. In some examples, a Metaverse or Metaverse network may enable the generation and provision of immersive virtual spaces in which remote users may socialize, collaborate, learn, shop and/or engage in various other activities within the virtual spaces, including through the use of Augmented Reality (AR)/Virtual Reality (VR)/Mixed Reality (MR).

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable. It is to be understood that the terminology used herein is for the purpose of describing particular aspects only, and is not intended to be limiting.

It is to be appreciated that certain features of the disclosed subject matter which are, for clarity, described herein in the context of separate embodiments, can also be provided in combination in a single embodiment. Conversely, various features of the disclosed subject matter that are, for brevity, described in the context of a single embodiment, can also be provided separately, or in any sub-combination. Further, any reference to values stated in ranges includes each and every value within that range. Any documents cited herein are incorporated herein by reference in their entireties for any and all purposes.

It is to be understood that the methods and systems described herein are not limited to specific methods, specific components, or to particular implementations. It is also to be understood that the terminology used herein is for the purpose of describing particular embodiments only and is not intended to be limiting.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation, or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim. References in this description to "an example", "one example", or the like, may mean that the particular feature, function, or characteristic being described is included in at least one example of the present embodiments. Occurrences of such phrases in this specification do not necessarily all refer to the same example, nor are they necessarily mutually exclusive.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The subject technology is directed to an assembly (e.g., a display assembly) in which displays may be coupled together. The assembly may be integrated with a head-mounted display (HMD). Using the assembly, the head-mounted display may present VR applications in which the physical, or real-world environment may be replaced by a computer-generated environment presented on the assembly as two-dimensional or three-dimensional computer-generated images.

To couple the displays together, one of the displays may include an inactive region or and another display may be aligned with the inactive region. The inactive region may include a transparent substrate, or a void/space in the display. The display with the inactive region may include a relatively larger area as compared to the other display. Furthermore, the display with the opening may include a display with OLED technology, while the other display may include a display with micro OLED technology. Accordingly, the display with the opening (e.g., larger display) may include a relatively lower resolution (e.g., display resolution) as compared to the other display (e.g., smaller display). Typically, however, material cost for OLED may be less than that of micro OLED, thus making OLED displays cheaper (per area of display) to manufacture as compared to micro OLED displays.

In addition to coupling (e.g., physically coupling) the displays of an assembly together, the displays of the assembly may also be tiled together. As a result, the assembly may provide two non-overlapping sections of an image, or images/videos, seamlessly and continuously across the displays, with each of the displays presenting a respective section of the image(s)/video(s). Beneficially, by using a larger display with relatively low resolution and a smaller display with relatively high resolution at the inactive region of the larger display, the head-mounted displays, utilizing the larger display and the smaller display, described herein may provide high-resolution display capabilities, while also providing a relatively low cost display area for additional visual effects. Further, the opening in the display (e.g. the larger display) may be centered or approximately centered. Put another way, the opening may be located at the center of the larger display. Users may typically focus on the center of the display. As a result, the effects of a low-resolution display (e.g., blurred imagery) may not be sensed by users of the head-mounted display.

These and other embodiments are discussed below with reference to FIGS. 1-15. However, those skilled in the art will readily appreciate that the detailed description given herein with respect to these Figures is for explanatory purposes only and should not be construed as limiting.

FIG. 1 illustrates an example of an artificial reality system 100. In some examples, the artificial reality system 100 may be used for VR applications and/or Augmented Reality (AR)/Mixed Reality (MR) applications. In some examples, the artificial reality system 100 may operate within, or be associated with, a Metaverse network. As shown, the artificial reality system 100 may include an HMD 102. The HMD 102 may include a head strap 104 (also referred to herein as head band) used to fit the HMD 102 onto a user's head. The HMD 102 may further include several image sensors. For example, the HMD 102 may include an image sensor 106a, an image sensor 106b, an image sensor 106c, and an image sensor 106d and each of the image sensors may be representative of an additional image sensor(s). In some examples, each of the image sensors 106a, 106b, 106c, and 106d may take the form of a camera designed to capture images (e.g., still images, motion images (e.g., video)) of the environment surrounding the HMD 102. Further, in some examples, a compressible shock absorbing device (not shown in FIG. 1) may be mounted on each of the image sensors 106a, 106b, 106c, and 106d. The shock absorbing device may be configured to substantially maintain the structural integrity of the image sensors 106a, 106b, 106c, and 106d in case an impact force is imparted on image sensors 106a, 106b, 106c, and 106d. In some examples, each of the image sensors 106a, 106b, 106c, and 106d may be pivotally and/or translationally mounted to the HMD 102 to pivot the image sensors 106a, 106b, 106c, and 106d at a range of angles and/or to allow for translation in multiple directions, in response to an impact. Also, each of the image sensors 106a, 106b, 106c, and 106d may protrude from a surface (e.g., a front surface, a corner surface, etc.) of the HMD 102 so as to provide the image sensors 106a, 106b, 106c, and 106d with, for example, an increased field of view (e.g., at least 180 degrees field of view), thus allowing the image sensors 106a, 106b, 106c, and 106d to view a relatively greater number of objects (e.g., a hand, a user, a surrounding real-world environment, etc.).

Also, the HMD 102 may further include an assembly 110. In some examples, the assembly 110 may include multiple displays coupled together. In this regard, in some examples the assembly 110 may be referred to as a display assembly 110 or multi-display 110. The assembly 110 may include a combination of displays with a different resolution (e.g., display resolution). For example, the assembly 110 may include an OLED display and a micro OLED display. This will be shown and described in further detail below. The assembly 110 may be configured to present visual information based on an artificial reality system application(s) (e.g., VR) and/or AR application(s) as well as MR application(s). Additionally or alternatively, the assembly 110 may be coupled (e.g., electrically coupled) to each of the image sensors 106a, 106b, 106c, and 106d, and may present visual information in the form of an external environment, as captured by one or more of the image sensors 106a, 106b, 106c, and 106d.

Figure 2:
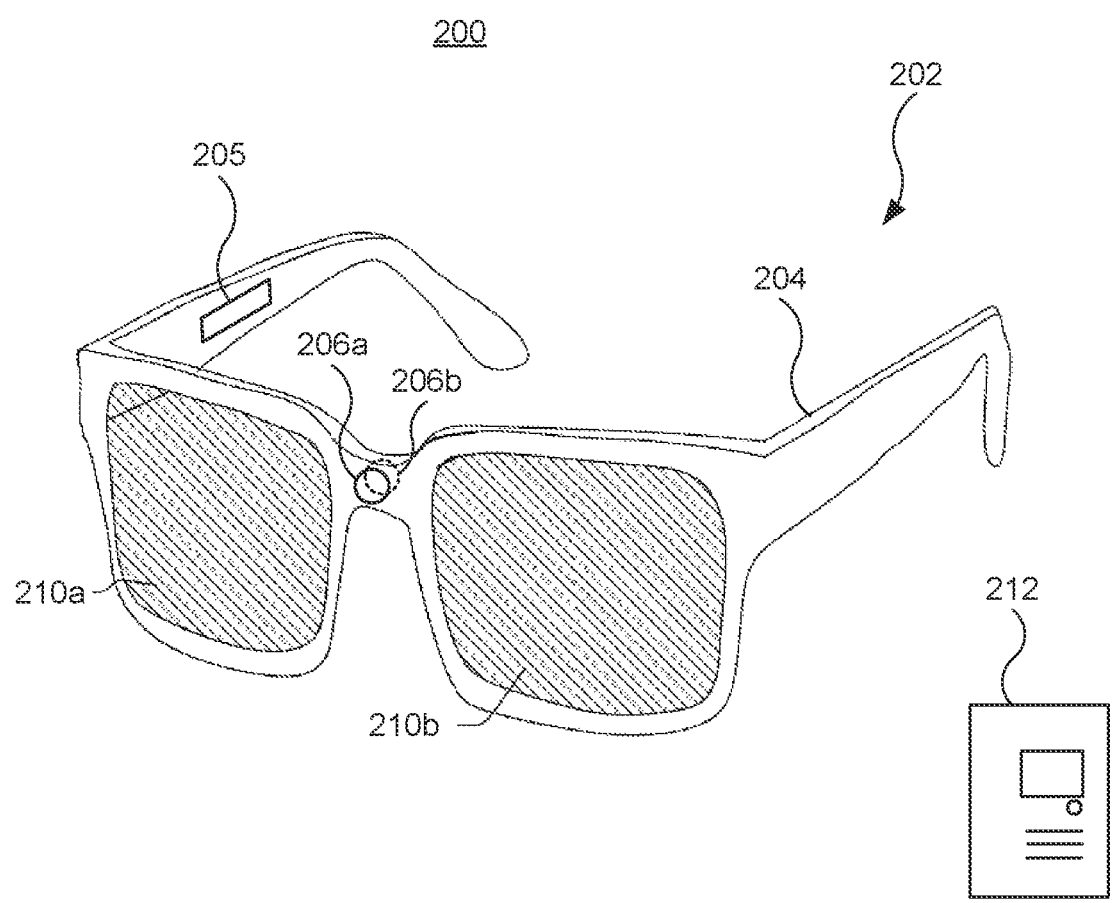

FIG. 2 illustrates an example of an artificial reality system 200. The artificial reality system 200 may include an HMD 202 (e.g., glasses (e.g., smart glasses)) that includes a frame 204 that may be placed on a user's head, including on a user's ears and nose. The frame 204 may carry or hold several components. For example, the frame 204 may hold an audio device 205. In some examples, the audio device 205 may take the form of a microphone designed to receive and convert ambient and/or user-based sounds into electrical signals. In this regard, the audio device 205 may provide sound waves (e.g., acoustical energy) in conjunction with artificial reality content. In some examples, the audio device 205 may take the form of audio speakers designed to convert electrical signals into sound waves. In some examples, the audio device 205 may be a combination of a microphone and an audio speaker(s). The audio device 205 is shown at a single, particular location on the frame 204. However, the audio device 205 may generally be positioned at other locations of the frame 204. Also, the HMD 202 may include additional audio devices having any feature shown and described for the audio device 205, and may be positioned at different locations on the frame 204.

The HMD 202 may further include one or more image sensors used to capture images and videos of environments. For example, the HMD 202 may include an image sensor 206a (e.g., front camera) used to capture an environment (e.g., real-world environment) at which a user of the HMD 202 is viewing. The HMD 202 may also include an image sensor 206b (e.g., rear camera, an eye tracking system) to, for example, track the vergence movement of the user wearing the HMD 202. The HMD 202 may include an assembly 210a and an assembly 210b held by the frame 204. Similar to the assembly 110 (shown in FIG. 1), each of the assemblies 210a and 210b may include multiple displays.

The artificial reality system 200 may further include a computing device 212 that includes a trackpad and/or one or more buttons. The computing device 212 may receive inputs from users and relay the inputs to the HMD 202. The computing device 212 may also provide haptic feedback to users. The computing device 212 may be connected to the HMD 202 through a wired (e.g., cable) or wireless connections (e.g., Bluetooth connection, Wi-Fi connection). In this regard, the HMD 202 and the computing device 212 may each be equipped with wired or wireless communication capabilities. Also, the computing device 212 may control the HMD 202 to, for example, provide VR, AR, MR content to the assemblies 210a and 210b. In some examples, the computing device 212 can be a standalone host computing device (e.g., smartphone) with a controller. Alternatively, the computing device 212 (or several components thereof) may be integrated within the HMD 202. Generally, the computing device 212 may take the form of any hardware platform capable of providing artificial reality content and receiving inputs from users.

Figure 3:
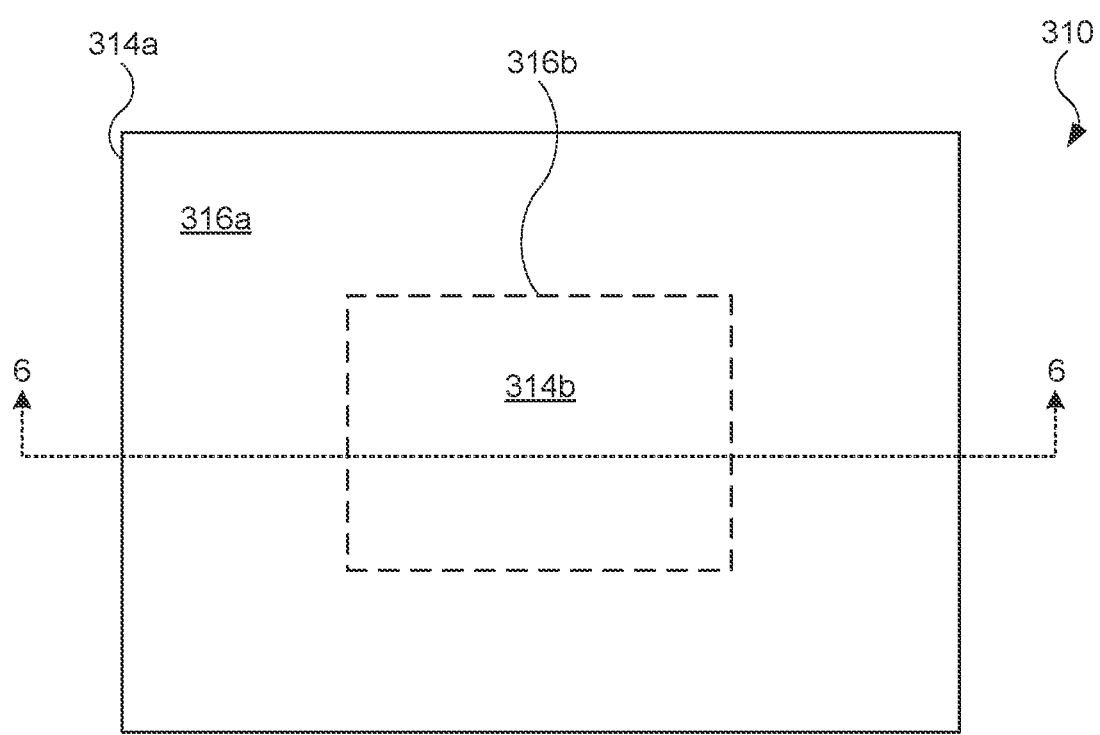
FIG. 3 illustrates a plan view of an example of an assembly with multiple displays, in accordance with aspects of the present disclosure.

FIG. 3 illustrates a plan view of an assembly 310. As shown, the assembly 310 includes a display 314a and a display 314b. The display 314a may include an active region 316a. The phrase "active region" of a display may refer to a location of the display that includes several pixels, each of which being operable to illuminate and collective being operable to present visual information in the form of textual information, still images, motion images (e.g., video(s)), or a combination thereof. The display 314a further includes an inactive region 316b. The phrase "inactive region" may refer to a location of a display that lacks or is free of (e.g., may not include) pixels, and thus may not present visual information. As shown, the active region 316a surrounds the inactive region 316b. Further, the display 314b is surrounded by the active region 316a of the display 314a. Put another way, it may be stated that the active region 316a of the display 314a surrounds the display 314b. The inactive region 316b may lack pixels, and thus may not present visual information. The inactive region 316b may include a transparent substrate, a semi-transparent substrate, or an opening (e.g., through hole) representing no material. The display 314b (shown as a dotted line) is covered by the inactive region 316b, and thus is at a location of the display 314a corresponding to the inactive region 316b. Generally, the active region 316a of the display 314b is shown in FIG. 3. Due in part to the inactive region 316b of the display 314a lacking pixels, the inactive region 316b may not be used to present visual information. However, visual information presented by the display 314b may nonetheless be transmitted through the inactive region 316b. For example, an original image(s) may be transmitted through/by the inactive region 316b. In other examples, a black image may be transmitted through/by the inactive region 316, which may achieve power reduction of the assembly 310. Also, as shown, the inactive region 316b of the display 314a may be centrally located (e.g., centered) with respect to the active region 316a of the display 314a. Thus, the display 314b may be centrally located with respect to the display 314a.

Each of the displays 314a and 314b may include a different area. For example, the area of the active region 316a of the display 314a may be greater than that of the display 314b. Also, in some examples, the display 314a may include an OLED display, and the display 314b may include a micro OLED display. Thus, each of the displays 314a and 314b may include a different pixel density or PPD. For example, the display 314a may include 10 to 20 PPD, and the display 314b may include 30 to 60 PPD. Accordingly, the display 314b may include a greater resolution than that of the display 314a.

Based in part on the respective characteristic of the displays 314a and 314b, the assembly 310 may provide several advantages. For example, the display 314b may represent a high-resolution display that may tend to cost more (per area of display) as compared to displays (e.g., display 314a) of a relatively lower resolution. However, by limiting the display 314b to a smaller display area and relying on the display 314a to present additional visual information, the cost of the assembly 310 may be less as compared to using a high-resolution display to present the visual information in its entirety. Moreover, users of HMDs tend to focus their eyes on a center, or central area, of a display of the HMD. By centrally locating the display 314b (a relatively high-resolution display) with respect to the display 314a (a relatively low-resolution display), users may focus more on the display 314b as compared to the display 314a. As a result, the user may tend not to notice the resolution disparity (e.g., lower display resolution of the display 314a). Beneficially, users may enjoy the same experience of fully high-resolution display, while the HMD may be developed and manufactured with the assembly at a lower price point(s).

Figure 4:
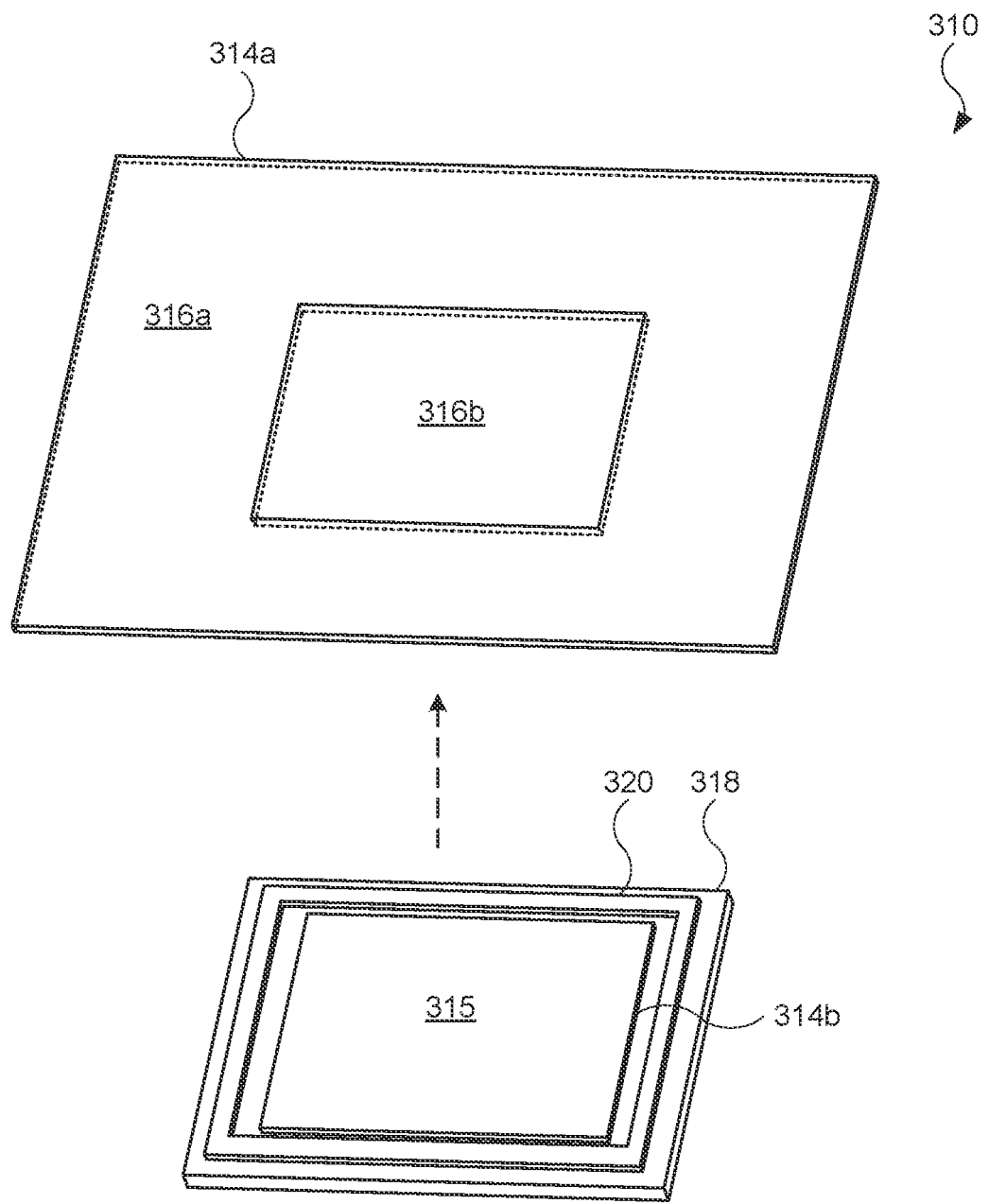
FIG. 4 illustrates an exemplary exploded view of the assembly shown in FIG. 3, in accordance with aspects of the present disclosure.

FIG. 4 illustrates an exploded view of the assembly 310. The display 314b may be located on a substrate 318. Further, the display 314b may couple, or secure, with a back surface (not shown in FIG. 4) of the display 314a by an adhesive 320 applied to the substrate 318. Further, the display 314b may include an active region 315 that is aligned with the inactive region 316b of the display 314a.

Figure 5:
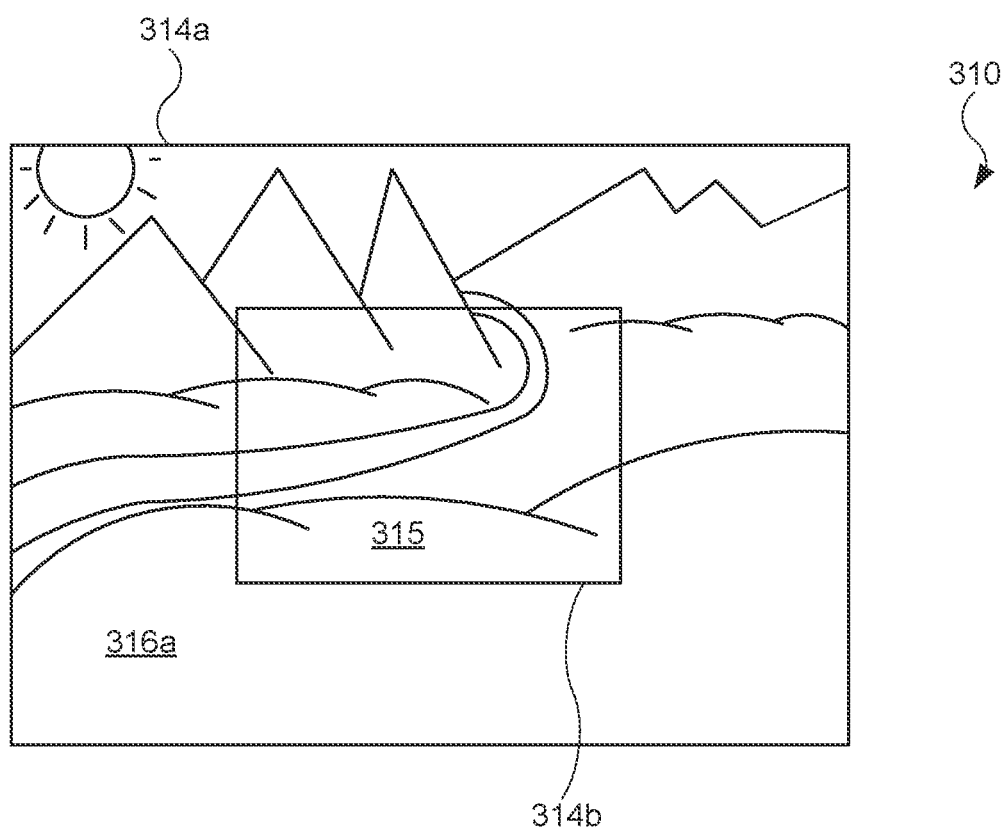
FIG. 5 illustrates the displays of an assembly presenting visual information, in accordance with aspects of the present disclosure.

FIG. 5 illustrates an example in which the displays 314a and 314b of the assembly 310 may be tiled, or synced, to present visual information together. As shown, the displays 314a and 314b may collectively present exemplary visual information (e.g., an image or a series of frames) in a non-overlapping manner. Accordingly, each of the displays 314a and 314b may represent a section of a graphics image that provides a respective region of the visual information, with one section of the visual information presented at the active region 316a of the display 314a, and the remaining section of the visual information presented at the display 314b. While a line is shown representing a transition from the active region 316a (of the display 314a) to an active region 315 of the display 314b, the line may generally not be visible to the human eye(s). Put another way, the transition from the active region 316a (of the display 314a) to the display 314b associated with the inactive region 316b, or vice versa, may appear seamless to a user.

In applications such as VR, AR, MR a user viewing the assembly 310 may tend to gaze or stare at the center (or generally a central location) of the assembly 310. Accordingly, the user's eyes may be focused on the display 314b, which also includes a relatively higher resolution as compared to that of the display 314a. Beneficially, the assembly 310 may rely on the display 314a, having lower resolution, larger area, and less cost than the display 314b, to provide the visual information that covers the user's peripheral field of view (FOV). On the other hand, the display 314b may provide higher resolution where a user may be expected to view the assembly 310 during a VR application, AR application, MR application and/or the like.

Figure 6:
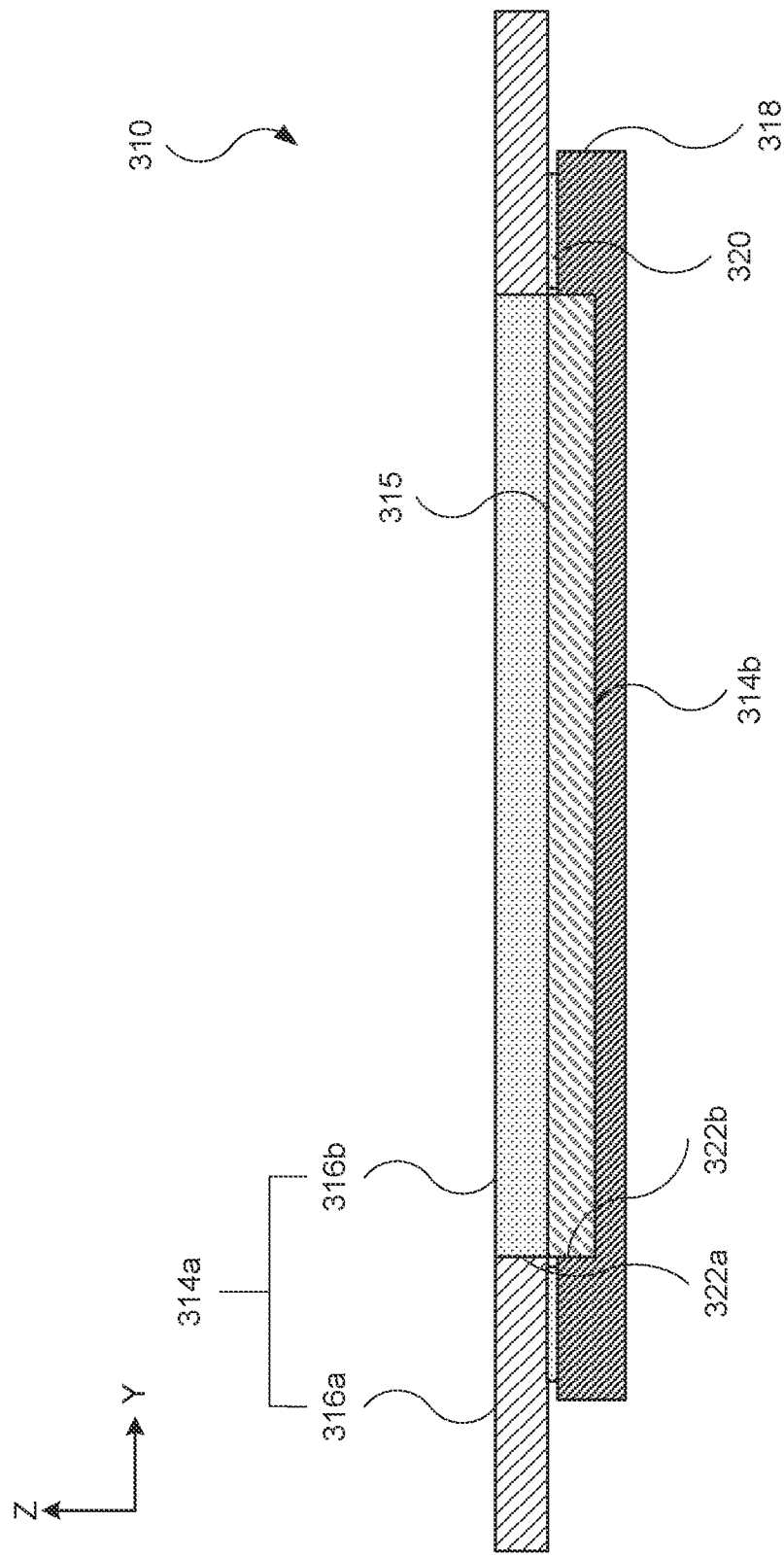
FIG. 6 illustrates a cross sectional view of the assembly shown in FIG. 3, taken along line 6-6 in FIG. 3, in accordance with aspects of the present disclosure.

FIG. 6 illustrates a cross sectional view of the assembly 310, taken along line 6-6 in FIG. 3. As shown, the display 314a and the substrate 318 are secured together by the adhesive 320, thus securing the displays 314a and 314b together. Also, the display 314b may be aligned, or at least substantially aligned, with the inactive region 316b of the display 314a. For example, the active region 316a of the display 314a includes an edge 322a, representing an end or boundary of the active region 316a and a transition to the inactive region 316b. Put another way, the edge 322a may separate the active region 316a from the inactive region 316b. The display 314b further includes an edge 322b, representing an end or boundary of the display 314b (including an active region thereof), that may be aligned with the edge 322a. An element that "aligns with" or "is aligned with" another element may refer to the elements arranged in a straight line (e.g., Z-axis in Cartesian coordinates in FIG. 6). However, in some instances, the displays 314a and 314b may overlap such that some pixels of the active region 316a of the display 314a at least partially cover some pixels of the display 314b (e.g., an active region 315 of the display 314b). This may be due to, for example, manufacturing tolerances and/or misalignment between the displays 314a and 314b during assembly. Using processing circuitry (e.g., from the one or more processor(s) 624 of FIG. 9), the assembly 310 may nonetheless determine which pixels of the display 314b are covered, and adjust the output of the displays 314a and 314b such that the displays 314a and 314b may provide an image/video output that may be tiled and the visual information on the displays 314a and 314b may be provided in a non-overlapping manner.

Figure 7:
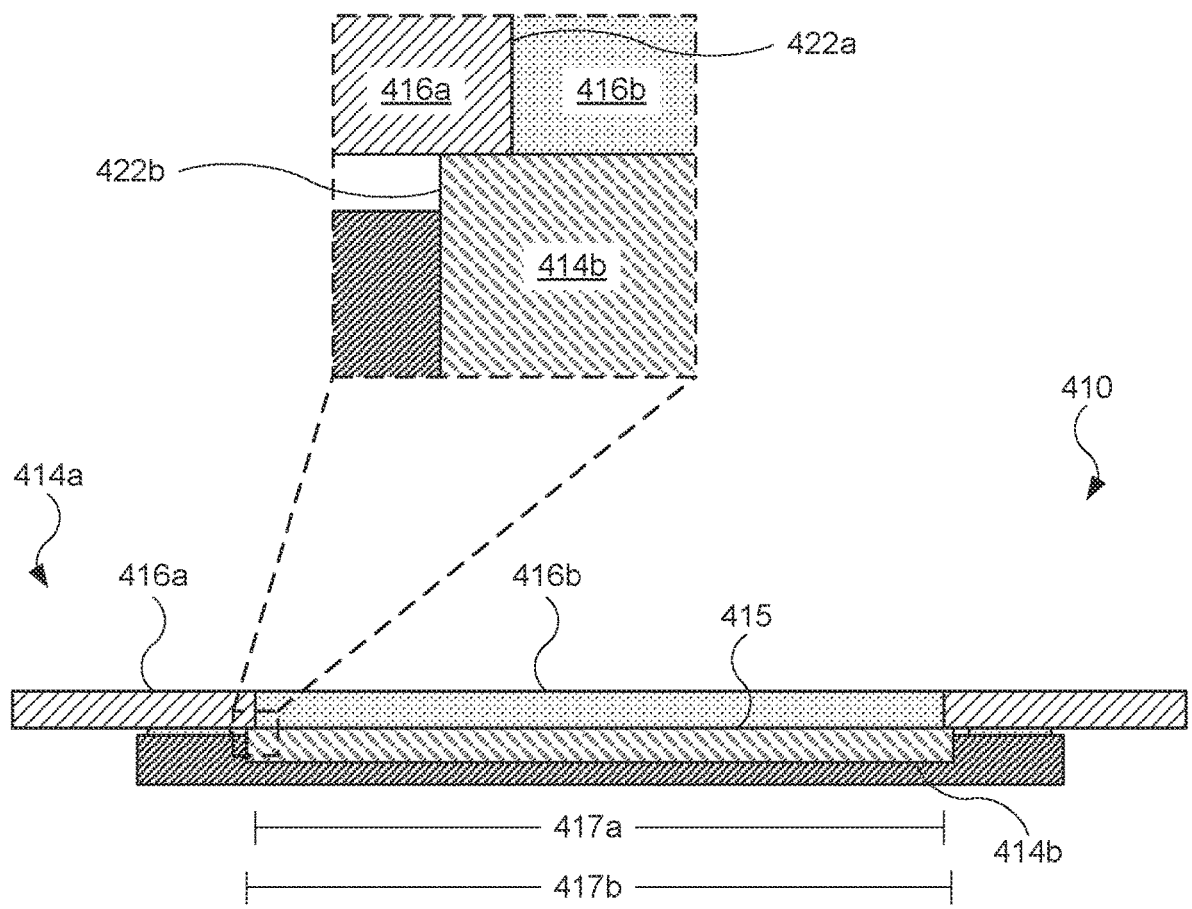
FIGS. 7 and 8 illustrate cross sectional views of an alternate example of an assembly, in accordance with aspects of the present disclosure.

FIG. 7 illustrates a cross sectional view of an alternate example of an assembly 410. As shown, the assembly 410 includes a display 414a and a display 414b. The display 414a may include an active region 416a and an inactive region 416b. The inactive region 416b includes a dimension 417a (e.g., width). Further, the display 414b may include an active region 415 includes a dimension 417b (e.g., width) that is greater than the dimension 417a. Based on the dimensions 417a and 417b, a disparity in the dimension and an area between an active region 415 of the display 414b and an inactive region 416b of the display 414a may be demonstrated. Further, the area of the active region 415 of the display 414b may also correspond to an area of a front plane (not shown in FIG. 7) of the display 414b such that the area of the front plane of the display 414b is greater than the area of the inactive region 416b of the display 414a. As a result, the active region 416a of the display 414a may overlap the display 414b. As shown in the enlarged view, an edge 422a of the active region 416a of the display 414a may be misaligned with an edge 422b of the display 414b, due to the overlap of the display 414b by the active region 416a of the display 414a. Beneficially, the dimensional mismatch between the inactive region 416b and the display 414b may ensure that the assembly 410 provides continuous visual information (e.g., image(s)/video(s) content). Put another way, the dimensional mismatch between the inactive region 416b and the display 414b may ensure that, with the exception of the inactive region 416b of the display 414a, no region of the assembly 410 may include gaps or inactive regions lacking pixels which may be incapable of presenting visual information. Also, while a single respective dimension is shown for the inactive region 416b and the display 414b, an additional dimension of the display 414b may also be greater than an additional dimension of the inactive region 416b. Thus, the area of the display 414b may be greater than the area of the inactive region 416b.

Figure 8:
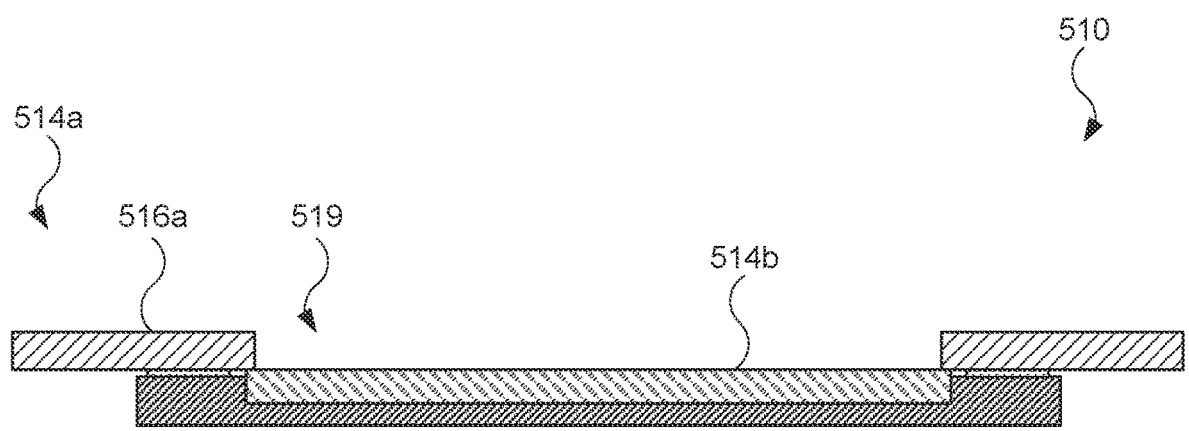

FIG. 8 illustrates a cross sectional view of an alternate example of an assembly 510, showing a display 514a with an active region 516a, and further showing an inactive region of the display 514a represented by an opening 519. As shown, the display 514b may be aligned with the opening 519 formed in the display 514a. Based on the opening 519 representing a void of material, the display 514b may present visual information (e.g., an image(s)/video(s)) without having to pass through a solid substrate or other tangible material.

Figure 9:
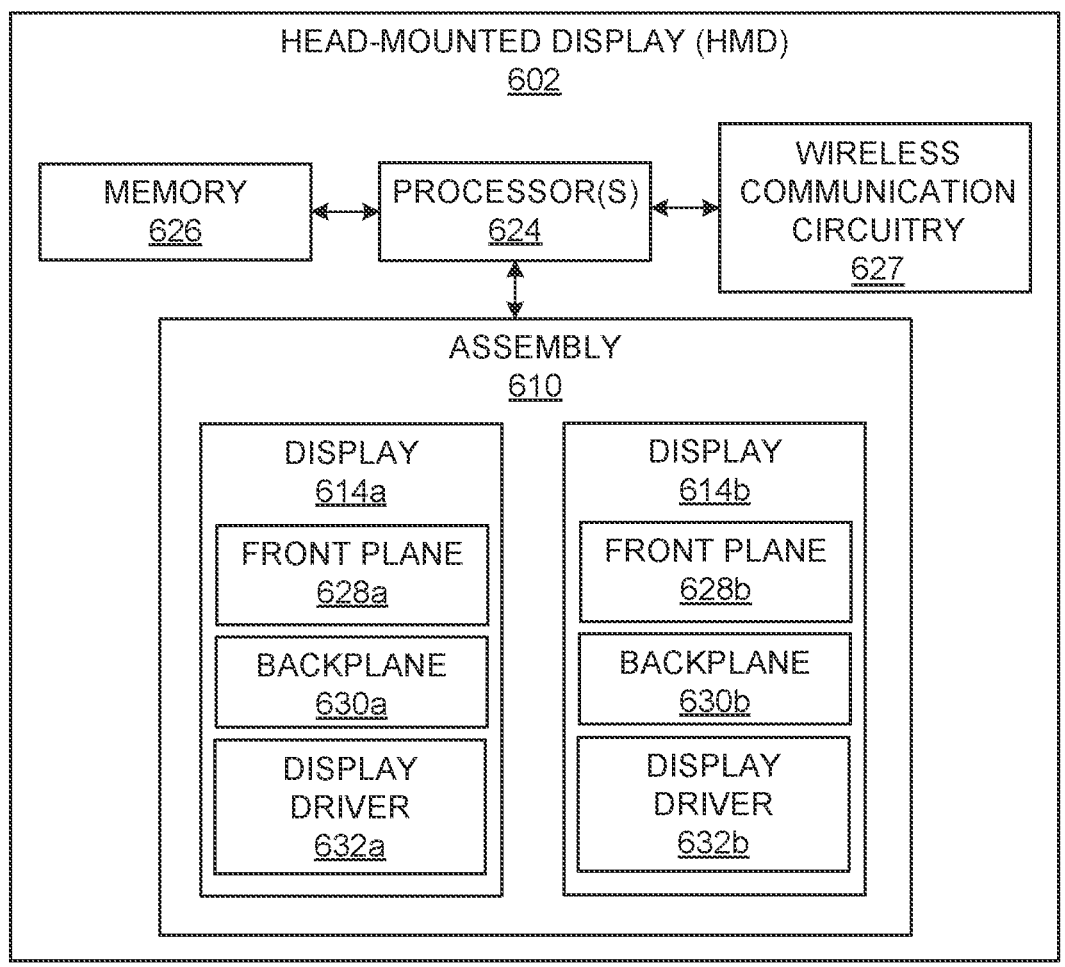
FIG. 9 illustrates a block diagram of a head-mounted device, in accordance with aspects of the present disclosure.

FIG. 9 illustrates a block diagram of an HMD 602. The HMD 602 may be part of an artificial reality system similar to those shown and/or described herein. Further, the HMD 602 may include any features described herein for an HMD. The HMD 602 may include one or more processors 624. The one or more processors 624 may include one or more microcontrollers, one or more micro electromechanical systems (MEMS), a central processing unit, an integrated circuit (e.g., system on a chip, or SOC), or a combination thereof.

The HMD 602 may further include memory 626. The memory 626 may include read-only memory (ROM) and/or random access memory (RAM). The memory 626 may store instructions that can be executed by the one or more processors 624. For example, the memory 626 can store instructions for VR applications, AR applications, MR applications and/or the like that are executable by the one or more processors 624. Further, the one or more processors 624 and the memory 626 may be incorporated into the HMD 602 (e.g., a device similar to the HMD 102 shown in FIG. 1). Alternatively, the one or more processors 624 and the memory 626 may be incorporated into a computing device (e.g., a device similar to the computing device 212 shown in FIG. 2) that may be separate from the HMD 602. In this regard, the HMD 602 may further include wireless communication circuitry 627 configured to establish and communicate through a wireless connection (e.g., Bluetooth connection, Wi-Fi connection).

The HMD 602 further includes an assembly 610 in communication with the one or more processors 624, thus allowing the assembly 610 to receive data and/or commands from the one or more processors 624. As shown, the assembly 610 includes a display 614a (e.g., similar to the display 314a of FIG. 3) and a display 614b (e.g., similar to the display 314b of FIG. 3). Similar to other examples of the present disclosure shown and described herein, the display 614a may include an active region and an inactive region, and the display 614b may include an active region that is aligned with the inactive region of the display 614a. The display 614a may include an OLED display and the display 614b may include a micro OLED display, as non-limiting examples. Additionally, in some examples, the display 614a may be a liquid crystal display (LCD). Accordingly, the display 614b may include a higher (or greater) resolution than that of the display 614a.

Each of the displays 614a and 614b may include several components. For example, the display 614a may include a front plane 628a, a backplane 630a, and a display driver 632a. The front plane 628a may include several pixels, each of which may illuminate to present visual information (e.g., image(s), video(s)). The backplane 630a may include circuitry (e.g., logic circuitry) designed to control (e.g., turn on to illuminate, turn off) each of the pixels of the front plane

628*a*. In some examples, the backplane 630*a* may include a thin film transistor (TFT) used as a switch to activate (e.g., turn on) and deactivate (e.g., turn off) the pixels of the front plane 628*a*. The display driver 632*a* may include a controller (e.g., control circuitry in the form of an integrated circuit) designed to communicate and receive instructions from the one or more processors 624, and provide instructions or commands to the backplane 630*a*. The backplane 630*a* may use the instructions or commands provided by the display driver 632*a* to control illumination of pixels of the front plane 628*a*, thus presenting visual information on the front plane 628*a*. Similarly, the display 614*b* may include a front plane 628*b*, a backplane 630*b*, and a display driver 632*b*. The front plane 628*b*, the backplane 630*b*, and the display driver 632*b* of the display 614*b* may include, and/or may utilize, any features described for the front plane 628*a*, the backplane 630*a*, and the display driver 632*a* of the display 614*a*, respectively. Also, the displays 614*a* and 614*b* may be separate displays that are tiled together. In this regard, the front plane 628*a* may be separate from the front plane 628*b*, or vice versa, but are tiled together.

In certain applications (e.g., VR applications), the one or more processors 624 may send instructions to the display driver 632*a* and the display driver 632*b* to operate and the displays 614*a* and 614*b* to present one or more images (or videos) in a tiled manner. Accordingly, the displays 614*a* and 614*b* may present distinct sections (e.g., of an image(s)/video(s)) and may collectively present one or more images/one or more videos. For example, the front plane 628*a* of the display 614*a*, along with the front plane 628*b* of the display 614*b*, may present visual information (e.g., at least one image or at least one video) such that the visual information is non-overlapping on the front plane 628*a* of the display 614*a* and on the front plane 628*b* of the display 614*b*. Further, the one or more processors 624 may determine misalignment, if any, between the displays 614*a* and 614*b*, and may use the respective display drivers (e.g., display driver 632*a*, display driver 632*b*) to control the respective backplanes (e.g., backplane 630*a*, backplane 630*b*) to adjust the output at the respective front planes (e.g., front plane 628*a* and front plane 628*b*) so as to correct the misalignment. For example, if the misalignment between the displays 614*a* and 614*b* is diagonal or crooked, the one or more processors 624 may generate commands to compensate the misalignment.

Also, the one or more processors 624 may determine overlap, if any, of the display 614*b* by the display 614*a*, and may use the respective display drivers (e.g., display driver 632*a*, display driver 632*b*) to control the respective backplanes (e.g., backplane 630*a*, backplane 630*b*) to adjust the output at the respective front planes (e.g., front plane 628*a* and front plane 628*b*) so as to compensate for the overlap. For example, if the pixels at or near the edge of the display 614*b* are covered by the display 614*a*, the one or more processors 624 may generate commands to compensate the coverage, which may include causing deactivation of the pixels of the display 614*b* that are covered by the display 614*a* and may create a virtual edge, or virtual boundary, represented by the outermost pixels that are uncovered by the display 614*a*.

FIGS. 10, 11, 12, 13 and 14 show alternative examples of assemblies and displays. The assemblies shown and described in FIGS. 10, 11, 12, 13 and 14 may include several features previously shown and described for an assembly. Further, the assemblies shown and described in FIGS. 10, 11, 12, 13 and 14 may be integrated with HMDs shown and described herein as part of an artificial reality system. Similar to prior examples of assemblies, the assemblies (including their respective displays) may provide the benefit of a centrally located, high resolution display surrounded by a relatively low-resolution display to provide high-resolution capabilities at a lower cost.

Figure 10:
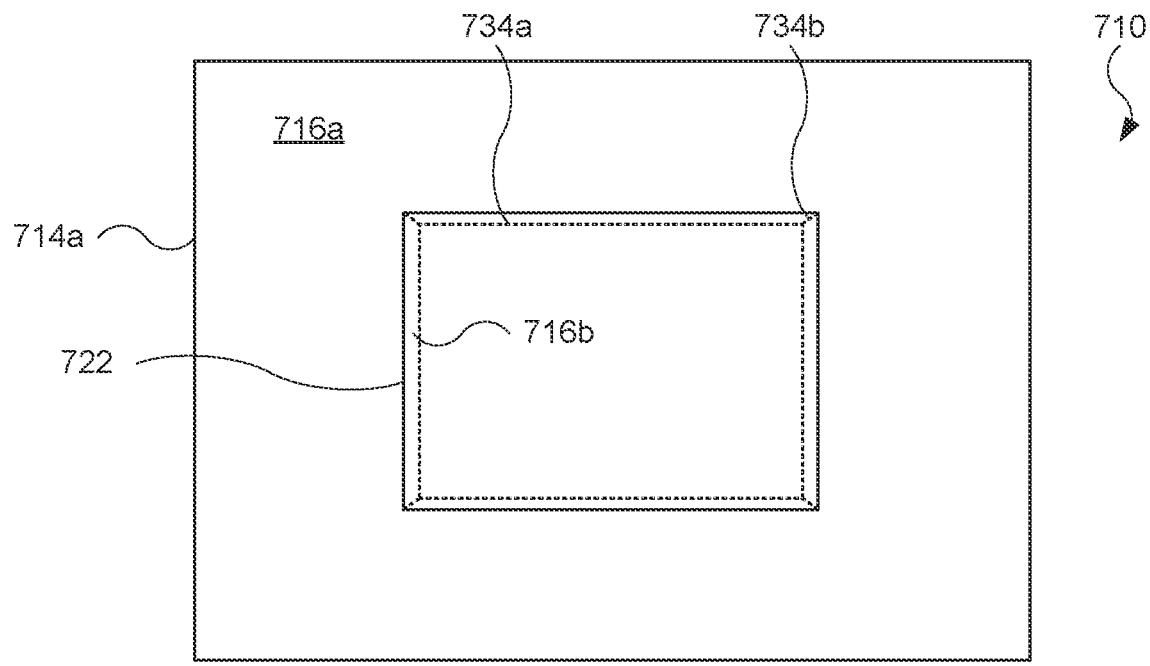
FIGS. 10, 11 and 12 illustrate an assembly that includes a display that may be cut to form an opening, in accordance with aspects of the present disclosure.

FIG. 10 illustrates an assembly 710 showing a display 714*a*. The display 714*a* may be modified for use with an additional display (not shown in FIG. 10). For example, several lines (e.g., dotted lines) representing locations of the display 714*a* that may be cut to form an opening in the display 714*a* are shown. For example, a line 734*a*, representative of one of four straight lines that forms a rectangular shape, provides a location along which the display 714*a* may be cut. In an instance in which the display 714*a* is cut along these aforementioned straight lines, a portion of the display 714*a* may be removed, resulting in an opening. Additionally, a line 734*b*, representative of one of four diagonal lines, provides a location along which the display 714*a* may further be cut. In an instance in which the display 714*a* is cut along the aforementioned diagonal lines, a portion of the display 714*a* may be folded away to further form the opening in the display 714*a*.

The display 714*a* further includes an active region 716*a* and an inactive region 716*b*. The active region 716*a* may be configured to present visual information (e.g., by illuminating pixels), while the inactive region 716*b* may not include pixels and may not present visual information. The active region 716*a* and the inactive region 716*b* may be separated by an edge 722 defined in part by cutting along the lines 734*a* and 734*b*. The edge 722 may separate the active region 716*a* from the inactive region 716*b*.

Figure 11:
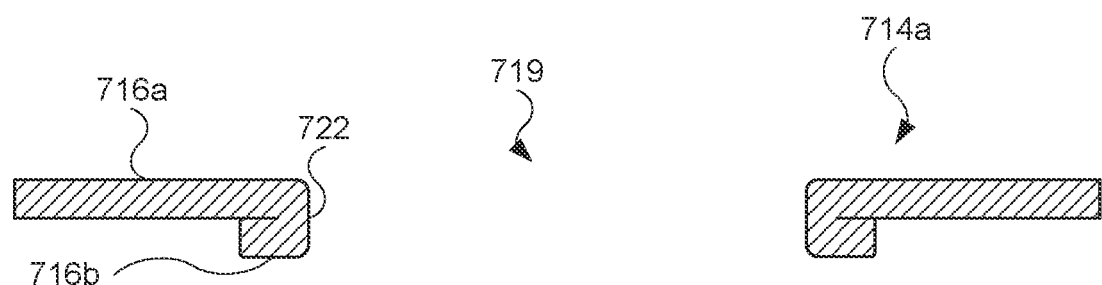

FIG. 11 illustrates a cross sectional view of the display 714*a* shown in FIG. 10. In an instance in which the display 714*a* is cut along the lines (e.g., lines 734*a* and 734*b* shown in FIG. 10), a portion of the display 714*a* may be removed thus forming an opening 719. Further, an additional portion of the display 714*a* may be folded. For example, the display 714*a* may be folded along the edge 722 such that the inactive region 716*b* may be folded behind the active region 716*a* such that the active region 716*a* and the inactive region 716*b* face away from each other.

Figure 12:
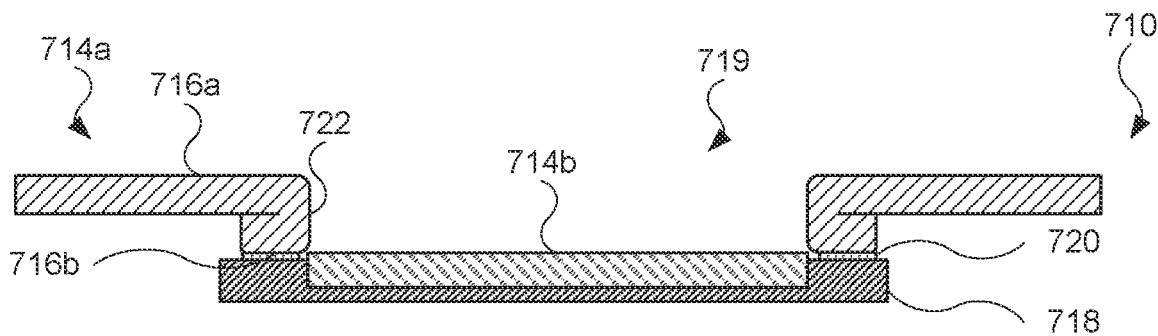

FIG. 12 illustrates a cross sectional view of the assembly 710, with a display 714*b* coupled to the display 714*a*. As shown, the display 714*b* may be embodied on/carried on a substrate 718 that may be secured by the display 714*a*, at the inactive region 716*b*, by an adhesive 720. When assembled with the display 714*a*, the display 714*b* may be aligned, or at least substantially aligned, with the opening 719 formed in the display 714*a*.

Figure 13:
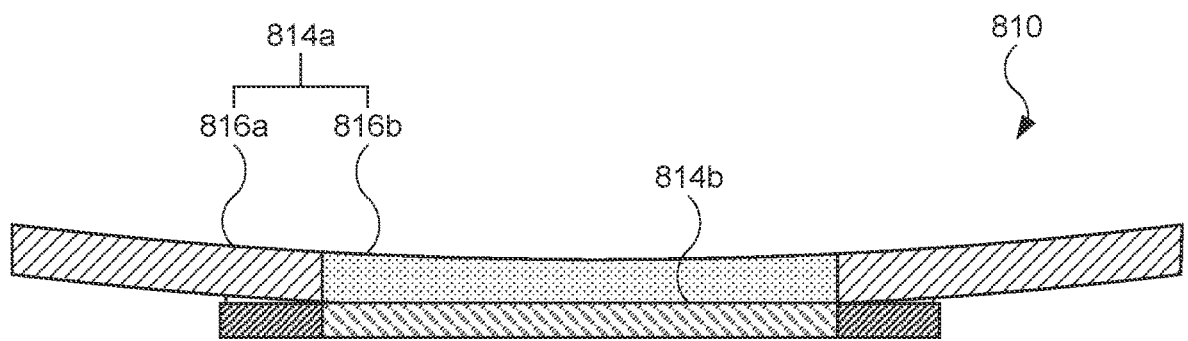
FIGS. 13 and 14 illustrate assemblies with a curved display, in accordance with aspects of the present disclosure.
Figure 14:
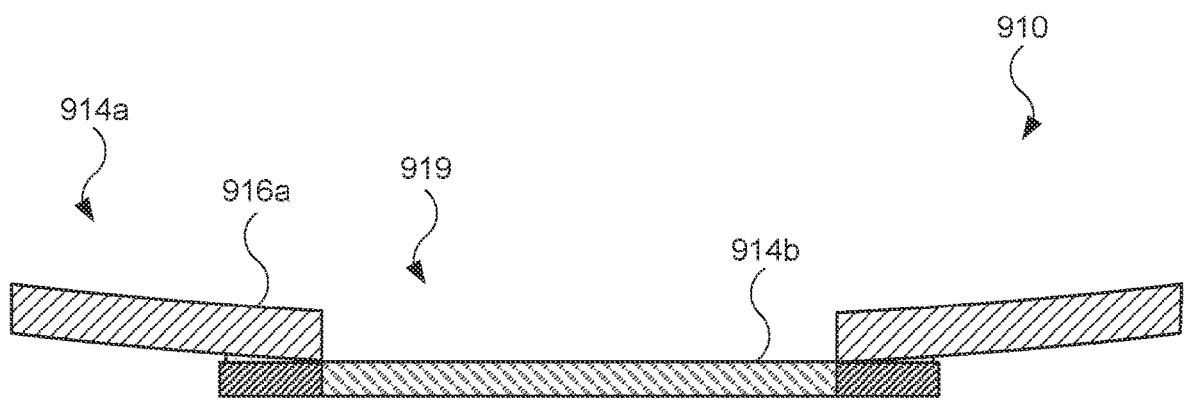

FIGS. 13 and 14 illustrate assemblies that may include a display that may take the form of a curved display. For example, FIG. 13 illustrates an assembly 810 that includes a display 814*a* and a display 814*b*. As shown, the display 814*a* includes an active region 816*a* and an inactive region 816*b*. The active region 816*a* may include a curve (e.g., non-linear) display region, thereby presenting visual information (e.g., image(s)/video(s)) on a curved surface. FIG. 14 illustrates an assembly 910 that may include a display 914*a* and a display 914*b*. As shown, the display 914*a* includes an active region 916*a*, with an opening 919 formed in the display 914*a*. Similar to the active region 816*a* (shown in FIG. 13), the active region 916*a* may include a curve (e.g., non-linear) display region, thereby presenting visual information (e.g., image(s)/video(s)) on a curved surface.

Figure 15:
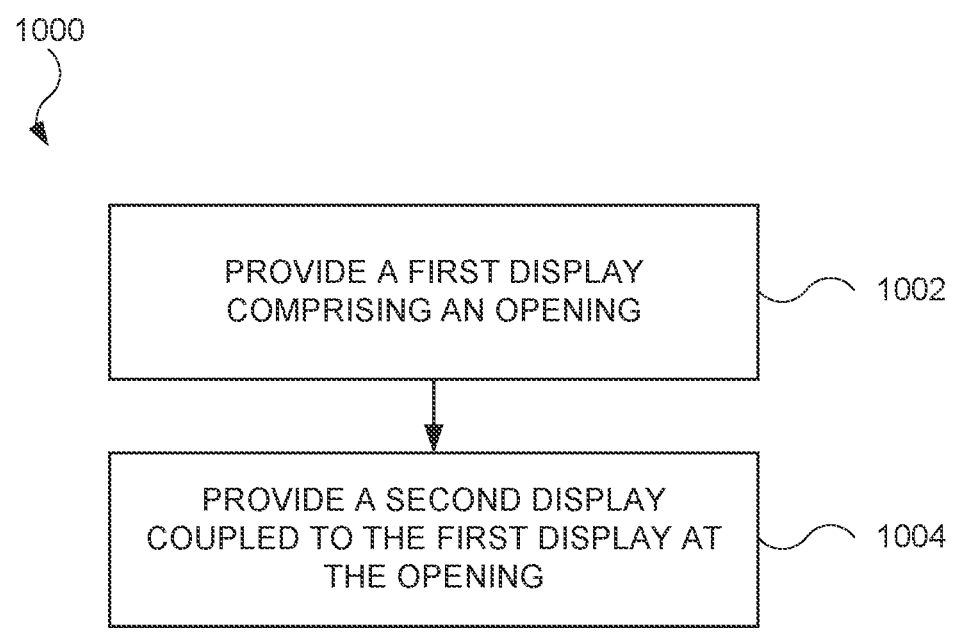
FIG. 15 illustrates an example flowchart illustrating operations for devices that may include multiple displays tiled together, in accordance with aspects of the present disclosure.

FIG. 15 illustrates an example flowchart 1000 illustrating operations for devices that may include multiple displays tiled together according to examples of the present disclosure. At operation 1002, a device (e.g., assembly 510 shown in FIG. 8) may provide a first display (e.g., display 514*a* shown in FIG. 8) that includes an opening (e.g., opening 519 shown in FIG. 8). The first display may include a first resolution. At operation 1004, a device (e.g., assembly 510) may provide a second display (e.g., display 514*b* shown in FIG. 8) coupled to the first display at the opening. The second display may include a second resolution different from the first resolution.

In some examples, the second resolution may be greater than the first resolution. In this regard, the second display (e.g., display 514*b*) may include a micro OLED display, and the first display (e.g., display 514*a*) may include an OLED or LCD display. The first display (e.g., display 514*a*) and the second display (e.g., display 514*b*) may be tiled together and may be configured to present at least one image or at least one video such that the at least one image or the at least one video is non-overlapping on the first display and the second display. The opening (e.g., opening 519) may include a through hole formed in the first display. The opening may present an inactive region of the first display.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

ALTERNATIVE EMBODIMENTS

The foregoing description of the embodiments has been presented for the purpose of illustration; it is not intended to be exhaustive or to limit the patent rights to the precise forms disclosed.

Some portions of this description describe the embodiments in terms of applications and symbolic representations of operations on information. These application descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A head-mounted display comprising:
one or more processors; and
a first display comprising:
  a first active region configured to present first visual information, wherein the first active region is folded along an edge that extends along a perimeter region defined by multiple interior surfaces of the first display, at least one of the multiple interior surfaces being generally orthogonal to at least an additional one of the multiple interior surfaces; and
  an inactive region surrounded by the first active region;
a second display comprising a second active region, the second active region configured to present second visual information, wherein the second active region is positioned adjacent the edge, the edge further extends along an additional perimeter region defined by multiple exterior surfaces of the second display, at least one of the multiple exterior surfaces being generally orthogonal to at least an additional one of the multiple exterior surfaces; and
a substrate, wherein the second display is embodied on the substrate and coupled with the first display based in part on adhesive applied to the substrate.

2. The head-mounted display of claim 1, wherein the inactive region is free of pixels.

3. The head-mounted display of claim 1, wherein:
the first display comprises a front plane; and
the first active region forms the front plane.

4. The head-mounted display of claim 1, wherein:
the first display comprises a front plane; and
the inactive region comprises an opening formed in the front plane.

5. The head-mounted display of claim 1, wherein:
the first display comprises a first pixel density; and
the second display comprises a second pixel density greater than the first pixel density.

6. The head-mounted display of claim 1, wherein:
the first display comprises a first front plane; and
the second display comprises a second front plane separate from the first front plane.

7. An assembly comprising:
a first display includes an opening comprising a first resolution and a first active region, wherein a part of the first display is folded along an edge that extends along a perimeter region defined by multiple interior surfaces of the first display, at least one of the multiple interior surfaces being generally orthogonal to at least an additional one of the multiple interior surfaces; and
a second display positioned at a location associated with the opening such that the second display is surrounded by the first display, wherein the second active region is positioned adjacent the edge, the edge further extends along an additional perimeter region defined by multiple exterior surfaces of the second display, at least one of the multiple exterior surfaces being generally orthogonal to at least an additional one of the multiple exterior surfaces, the second display comprising:
a second resolution different from the first resolution; and
a second active region.

8. The assembly of claim 7, wherein the second resolution is greater than the first resolution.

9. The assembly of claim 7, wherein the first display and the second display are configured to present at least one image or at least one video such that the at least one image or the at least one video is presented by the first display and the second display.

10. The assembly of claim 7, wherein:
the first display comprises a first front plane; and
the second display comprises a second front plane separate from the first front plane.

11. The assembly of claim 7, wherein:
the first display comprises a first pixel density; and
the second display comprises a second pixel density greater than the first pixel density.

12. The assembly of claim 7, wherein the opening comprises a through hole formed in the first display.

13. The assembly of claim 7, further comprising a substrate, wherein the first display and the second display are elevated relative to the substrate.

14. The assembly of claim 7, wherein:
the first display comprises a first organic light-emitting diode (OLED) display; and
the second display comprises a second OLED display.

15. A display comprising:
a first front plane comprising:
an active region comprising pixels; and
an inactive region surrounded by the active region, wherein:
the inactive region is independent of the pixels,
the first front plane is folded along an edge to form an opening defined by a fold, the edge extending along a perimeter region defined by multiple interior surfaces of the first front plane, at least one of the multiple interior surfaces being generally orthogonal to at least an additional one of the multiple interior surfaces,
the edge separating the active region from the inactive region such that the inactive region faces away from the active region;
a backplane configured to control illumination of the pixels and present visual information on the first front plane;
a second front plane aligned with the opening; and
a substrate wherein:
the second front plane is embodied on the substrate and the edge extending along an additional perimeter region defined by multiple exterior surfaces of the second front plane, at least one of the multiple exterior surfaces being generally orthogonal to at least an additional one of the multiple exterior surfaces, and
the substrate is coupled with the first front plane at the inactive region.

16. The display of claim 15, wherein the inactive region comprises the opening formed in the first front plane.

17. The display of claim 16, wherein the first front plane is configured to present, with the second front plane aligned with the opening, at least one image or at least one video such that the at least one image or the at least one video is non-overlapping on the first front plane and the second front plane.

18. The display of claim 15, wherein the opening comprises a first area that is less than a second area of the second front plane.

19. The display of claim 15, wherein the inactive region comprises a transparent substrate.

20. The display of claim 15, wherein the substrate is coupled with the first front plane at the fold of the first front plane.

* * * * *